US006643139B2

(12) United States Patent
Tien

(10) Patent No.: US 6,643,139 B2
(45) Date of Patent: Nov. 4, 2003

(54) MODULE CARRIER OF COMPUTER

(75) Inventor: Kai-Chen Tien, Taipei Hsien (TW)

(73) Assignee: Acer Inc. (TW)

( * ) Notice: Subject to any disclaimer, the term of this patent is extended or adjusted under 35 U.S.C. 154(b) by 205 days.

(21) Appl. No.: 09/912,481

(22) Filed: Jul. 26, 2001

(65) Prior Publication Data

US 2002/0071254 A1 Jun. 13, 2002

(30) Foreign Application Priority Data

Dec. 13, 2000 (CN) .......................................... 89126642 A

(51) Int. Cl.[7] ................................................. G60F 1/16
(52) U.S. Cl. ........................ 361/727; 361/684; 361/685; 361/726; 312/223.2; 364/708.1; 292/148
(58) Field of Search ................................ 361/683–686, 361/724–727, 754, 798; 364/708.1; 312/223.1, 223.2, 223.3; 439/153, 155, 159, 160, 928.1; 360/98.01, 97.01, 137; 292/148, 151, 307 R; 248/551–553

(56) References Cited

U.S. PATENT DOCUMENTS 5,544,009 A * 8/1996 Hosoya et al. ............... 361/684
5,692,208 A * 11/1997 Felcman et al. ............. 361/683
6,452,787 B1 * 9/2002 Lu et al. ...................... 361/683
6,469,900 B2 * 10/2002 Cheng ......................... 361/726
6,510,051 B2 * 1/2003 Kim ............................ 361/686

* cited by examiner

*Primary Examiner*—Michael Datskovsky
(74) *Attorney, Agent, or Firm*—Michael D. Bednarek; Shaw Pittman LLP

(57) ABSTRACT

A module carrier of computer comprises a tray, a transmission apparatus, a pushing arm, and a spring sheet. The transmission apparatus comprises a lever, a lever arm, and a fastening bolt. The tray is employed to carry the module of computer. The transmission apparatus is employed to release the fastened status of the tray, wherein the lever is employed to start the module carrier of computer so as to perform the ejection motion of the module of computer; the lever arm is employed to provide the transmission action and one end of the lever arm is joined to the lever; and the fastening bolt is employed to fasten the tray and its one end joins to the lever arm. The pushing arm is employed to push and eject the tray. The spring sheet is attached to the pushing arm for providing the needed spring force for ejecting the tray. After a user operates the lever, the lever arm will rotate and the fastening bolt will move to release the fastened status of the tray, and then the spring sheet provides a spring force to the pushing arm enabling the pushing arm to push and eject the tray.

18 Claims, 9 Drawing Sheets

MODULE CARRIER OF COMPUTER

REFERENCE TO RELATED APPLICATION

The present application claims priority from Taiwan Application No. 089126642, entitled "Module Carrier of Computer," filed on Dec. 13, 2000.

BACKGROUND OF THE INVENTION

1. Field of the Invention

The present invention relates to a module carrier of computer, and more particularly, to the module carrier of computer, which enables a user to easily, mount and dismount the module of a computer of notebook type.

2. Description of the Prior Art

Computer technology is different from day to day, and a variety of peripheral devices have become the standard equipments to be mounted on computers as modules. Since the notebook computer is easy to carry and becomes more and more compact with a reasonable price, the notebook computer becomes more and more popular. Meanwhile, since the size of a notebook computer is required to be as small as possible, most of the peripheral devices of a notebook computer are designed to become independent modules so as to be mounted and dismounted easily.

However, dismounting a module from a notebook computer is not so easy at present. To a user who wants to dismount a module, he has to reverse the notebook computer first, then to release the fixing apparatus with one hand and push the module out from the notebook computer with the other hand. Moreover, if the user applies an improperly force when withdrawing the module, he could damage the connecting device between the module and the motherboard.

It is known in the prior art, the module carrier employs a gear set for moving between the module and a computer. Please refer to FIG. 1, which is a schematic diagram showing a gear set 1 accompanying with a rack 2 for moving the supporting plate 3 according to the prior art in which the gear set 1 and the rack 2 are made of metal. However, the disadvantages are that the gear set 1 and the rack 2 are too heavy and occupy a large space. Furthermore, the gear set 1 and the rack 2 can only function as moving elements for moving the supporting plate 3, and a user still needs to dismount the module manually.

SUMMARY OF THE INVENTION

It is therefore a primary object of the present invention to provide a module carrier of computer so as to enable users to choose and install the required module according to their needs.

One more object of the present invention is to provide a module carrier of computer so as to enable users, without the necessary of reversing the computer, to eject the module of computer by only operating the lever installed.

For achieving the objects mentioned above, the present invention provides a module carrier of computer wherein a transmission apparatus is installed on a base plate such that, by applying the lever principle, the tray holding the module carrier thereon can be ejected from the base plate automatically for users to mount or dismount the module of computer. For ejecting the module of computer from the computer, at first, a user has to release the fastened status of the tray for moving the tray outwardly, then relying on the pushing arm and the spring force of the spring sheet to eject the tray fully out, thus to accomplish the ejection motion of the module of computer. For mounting the module of computer, the user only needs to push the tray toward the base plate and the fastening status between the tray and the base plate can be thus achieved.

These and other objects of the present invention will become obvious to those of ordinary skill in the art after reading the following detail description of the preferred embodiment, which is illustrated in the various figures and drawings.

DETAILED DESCRIPTION OF THE PREFERRED EMBODIMENT

Figure 1:
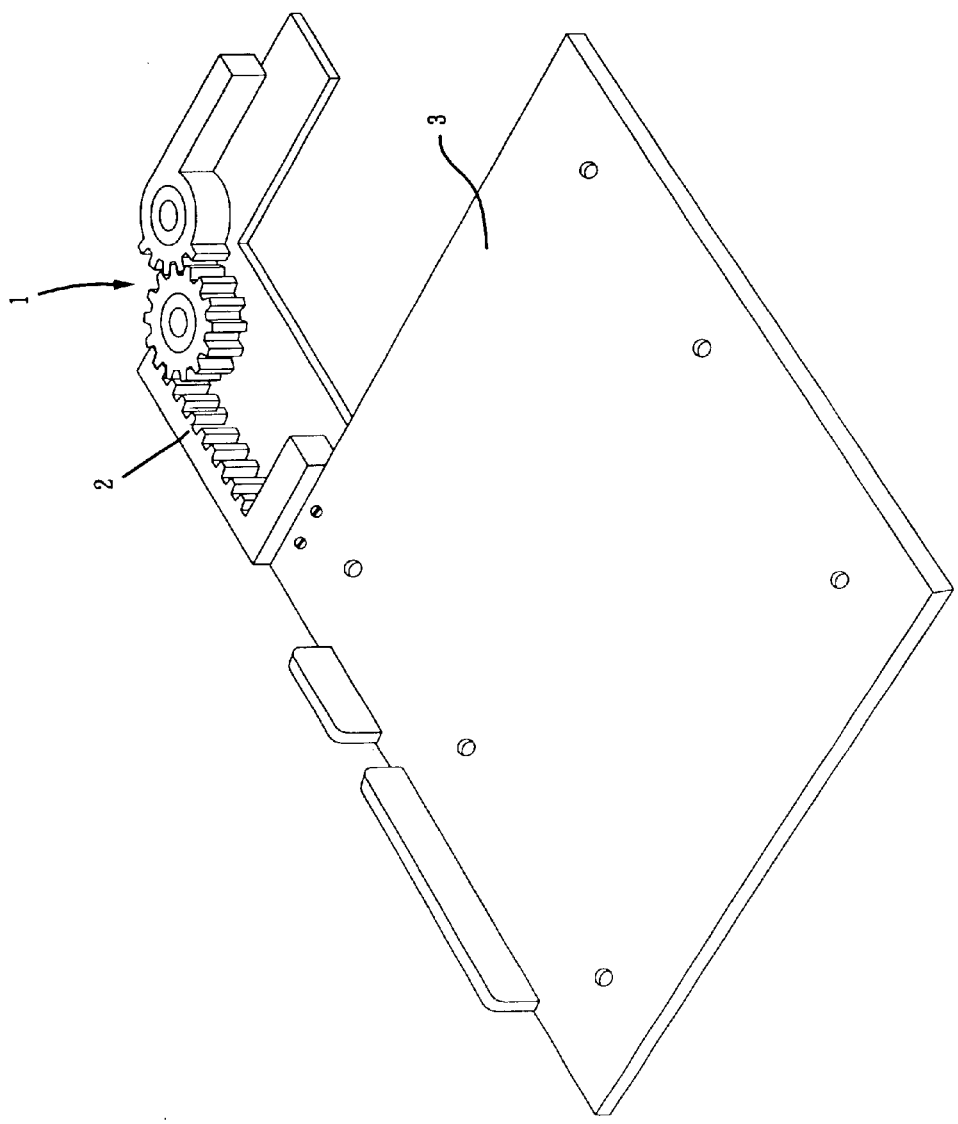
FIG. 1 is a schematic diagram showing a gear set accompanying with a rack for moving the module according to the prior art.
Figure 2:
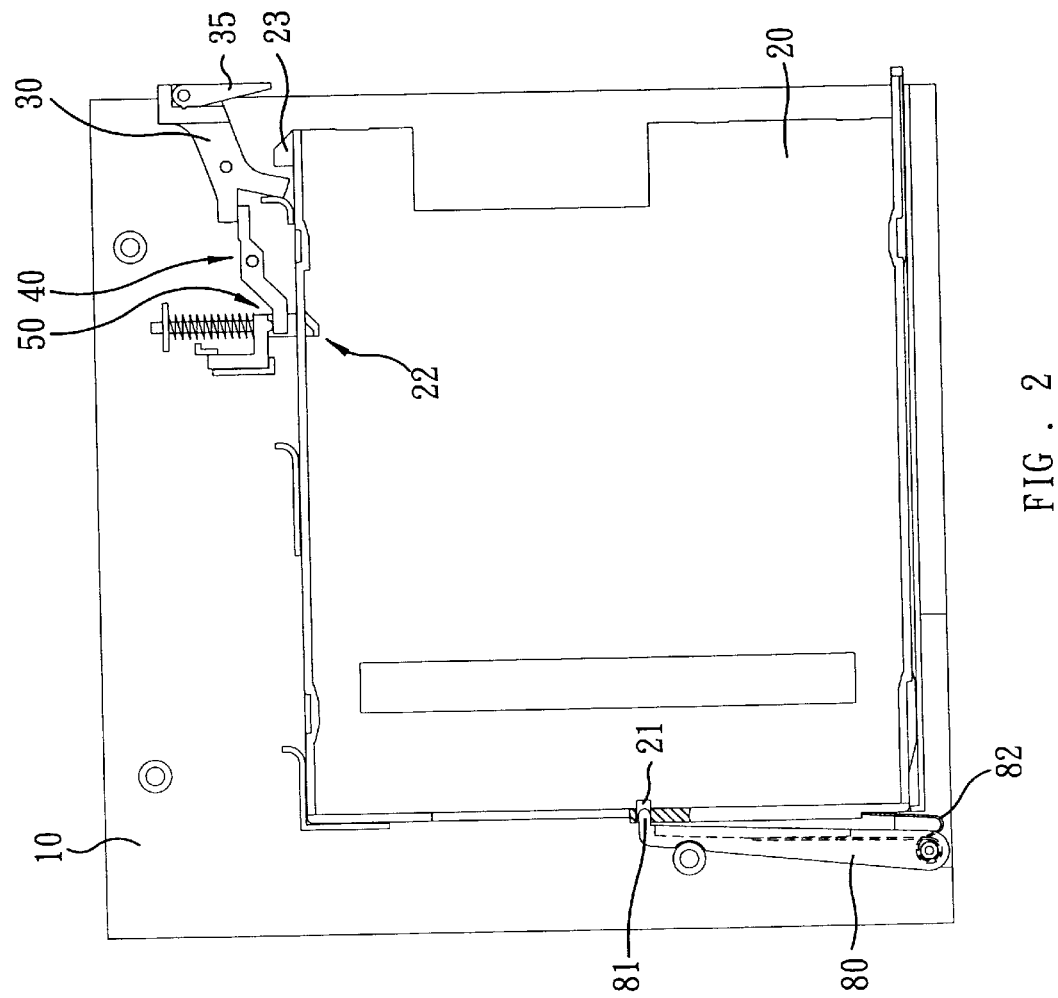
FIG. 2 is a schematic diagram of the first embodiment according to the present invention.

Please refer to FIG. 2, which is a schematic diagram of the first embodiment according to the present invention. The module carrier of computer is installed on a base plate 10 and comprises a tray 20, a transmission apparatus, a pushing arm 80, and a spring sheet 82, wherein the transmission apparatus further comprises a lever 35, a first lever arm 30, a second lever arm 40, and a fastening bolt 50. The tray 20 is employed to carry the module. The transmission apparatus is employed to release the fastened status of the tray 20. The lever 35 is employed to start the module carrier so as to perform the ejection motion of the module. The first lever arm 30 is employed to provide the transmission action with one end of the first lever arm 30 joining the lever 35. The second lever arm 40 is also employed to provide the transmission action with one end of the second lever arm 40 joining the first lever arm 30. The fastening bolt 50 is employed to fasten the tray 20 and joins the second lever arm 40. The pushing arm 80 is employed to push and eject the tray 20 and the pushing arm 80 comprises a projecting portion 81 at one end. The spring sheet 82 is attached to the pushing arm 80 for providing the pushing arm 80 with the needed spring force for ejecting the tray 20. The tray 20 comprises a sunken slot 21 for adapting the projecting portion 81, a fastening slot 22 for the fastening bolt 50 to fasten the tray 20, and a projecting tooth 23 to fasten the first lever arm 30.

According to the present invention, the major operation concept is that, before the tray 20 is ejected from the computer, a spring force for ejecting the module is hidden and stored in the module carrier. For ejecting the module from the base plate 10, a user has to release the fastened status of the tray 20 fastened on the base plate 10. The fastened status is composed of, the fastening between the fastening slot 22 and the fastening bolt 50, and the locking between the sunken slot 21 and the projecting portion 81. A more detail descriptions of the transmission status of the module carrier are given below.

Figure 3:
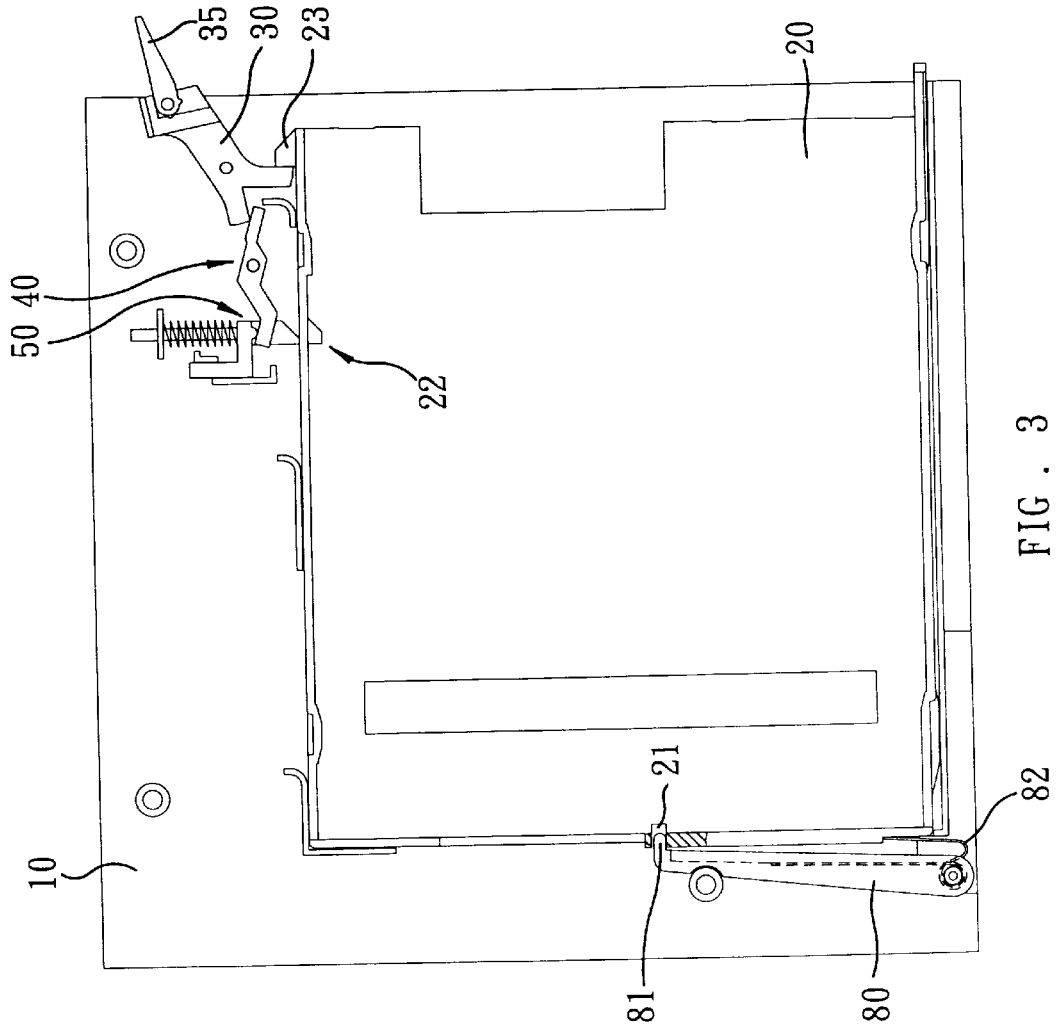
FIG. 3 shows the first transmission status of the first embodiment according to the present invention.
Figure 4:
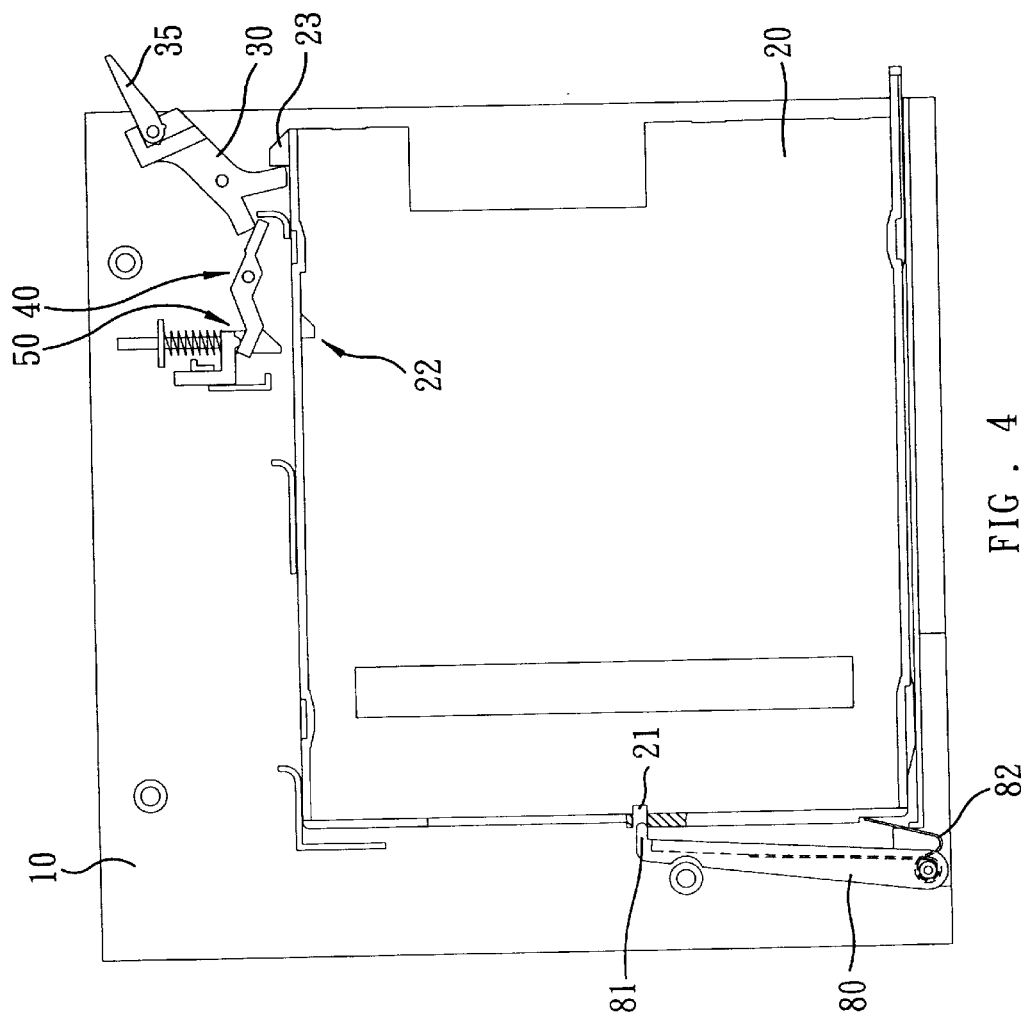
FIG. 4 shows the second transmission status of the first embodiment according to the present invention.
Figure 5:
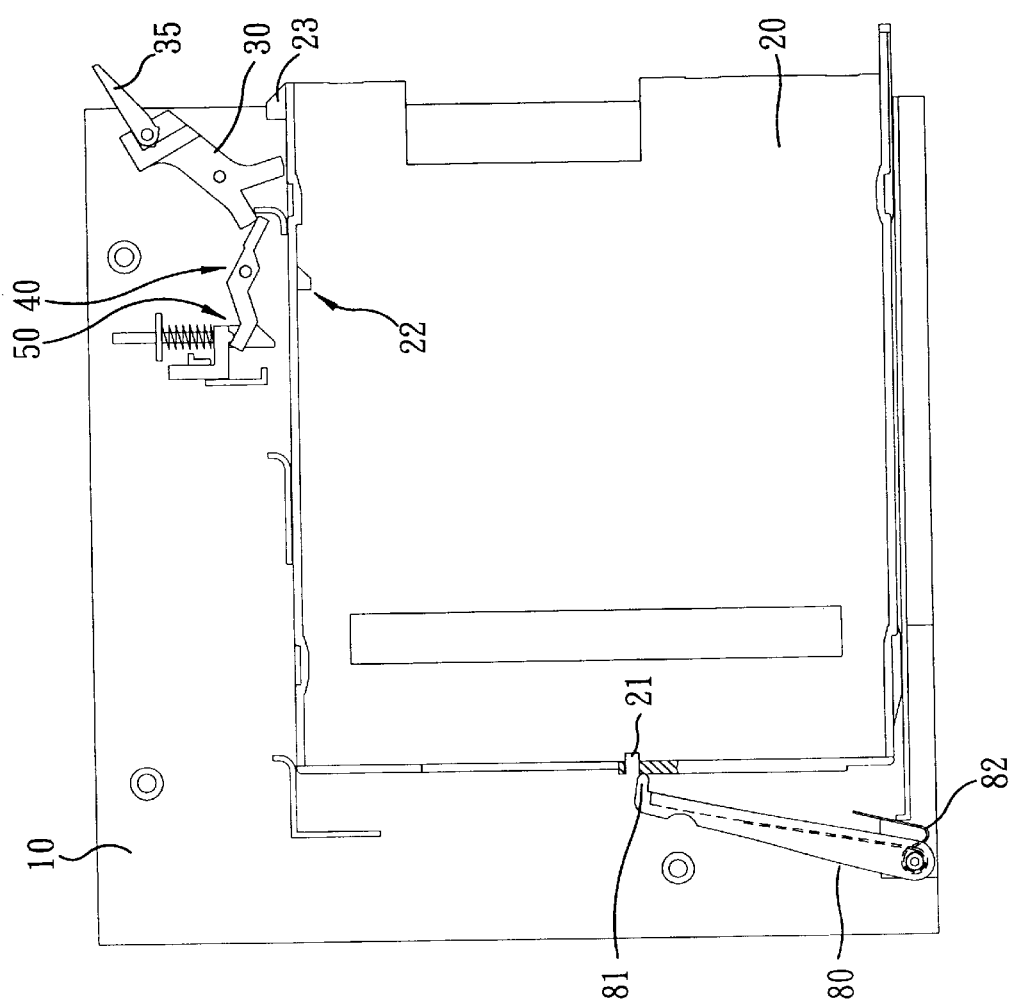
FIG. 5 shows the third transmission status of the first embodiment according to the present invention.

Please refer to FIG. 3 to FIG. 5, which show the continuous transmission status of the first embodiment according to the present invention. The present invention applies concept of the lever principle. As shown in FIG. 3, after a user operates the lever 35, the lever 35 acts on the first lever arm 30 so that the first lever arm 30 will rotate, and the second lever arm 40 will rotate accordingly. Then the second lever arm 40 acts on the fastening bolt 50 to move away from the fastening slot 22 for releasing the fastened status of the tray 20, at the same time, the first lever arm 30 pushes the projecting tooth 23 causing the tray 20 to move outwardly; however, at this moment, the projecting portion 81 of the pushing arm 80 still fastens the sunken slot 21 of the tray 20 so that the tray 20 can not be ejected by the spring sheet 82 and the pushing arm 80. As shown in FIG. 4, after the lever 35 progresses further to a larger angle, the first lever arm 30 keeps on pushing the projecting tooth 23 until the projecting portion 81 escapes from the sunken slot 21. Then, as shown in FIG. 5, after the projecting portion 81 escapes from the sunken slot 21, the pushing arm 80 will employ the spring force of the spring sheet 82 to eject the tray 20 so as to accomplish the ejection motion of the module of computer.

Figure 6:
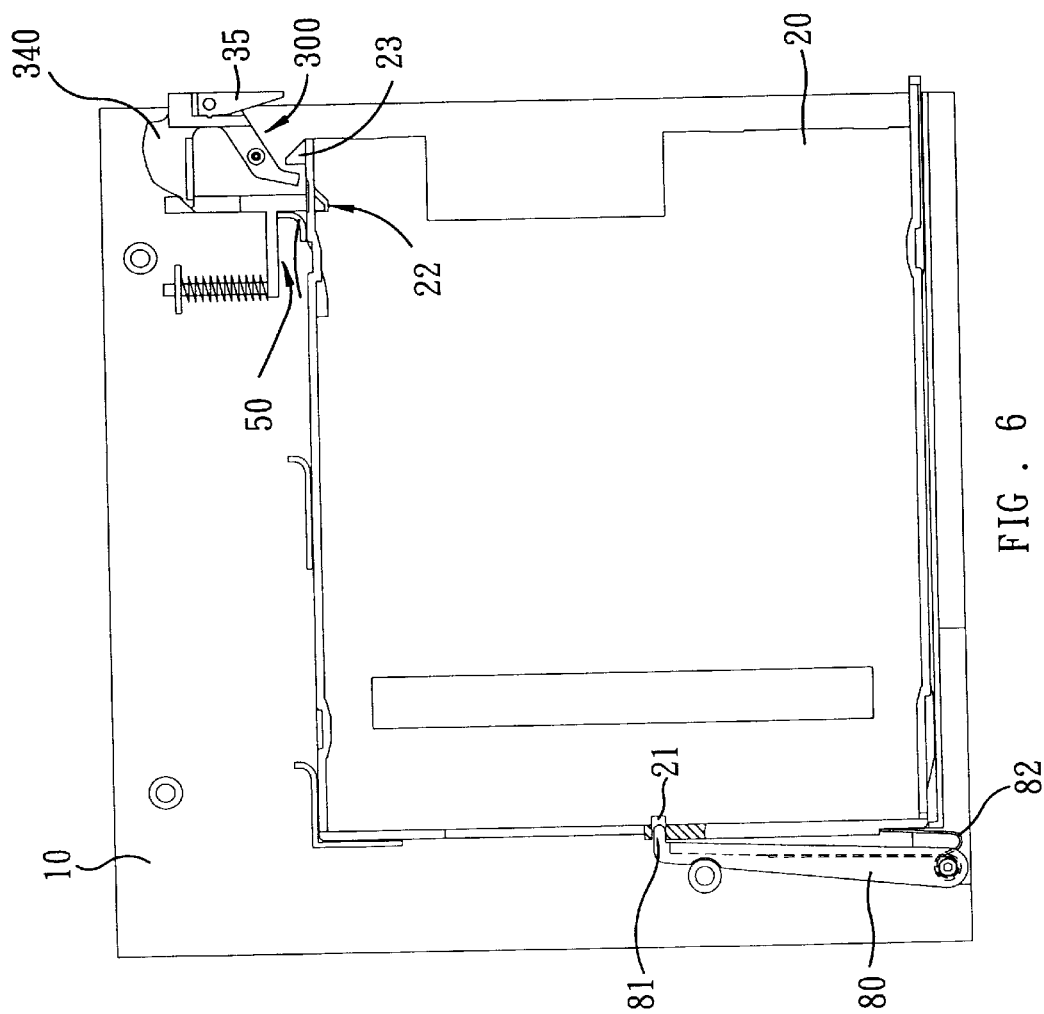
FIG. 6 is a schematic diagram of the second embodiment according to the present invention.

Please refer to FIG. 6, which is a schematic diagram of the second embodiment according to the present invention. The second embodiment differs from the first embodiment in that their transmission apparatuses are different. The transmission apparatus in the second embodiment comprises a lever 35, a lever arm 300, and a fastening bolt 50. The transmission statuses of the second embodiment are similar to the first embodiment. After a user operates the lever 35, the lever 35 acts on the lever arm 300 so that the lever arm 300 will rotate and then push the projecting tooth 23 causing the tray 20 to move outwardly. At the same time, a projecting block 340, which joins the lever 35, acts on the fastening bolt 50 to move away the fastening bolt 50 from the fastening slot 22 for releasing the fastened status of the tray 20. Then, after the lever 35 progresses further to a larger angle, the lever arm 300 keeps on pushing the projecting tooth 23 until the projecting portion 81 escapes from the sunken slot 21 so as to release the fastened status between projecting portion 81 and the sunken slot 21. Then, the spring sheet 82 will provide the spring force to eject the tray 20 so as to accomplish the ejection motion of the module of computer.

Figure 7:
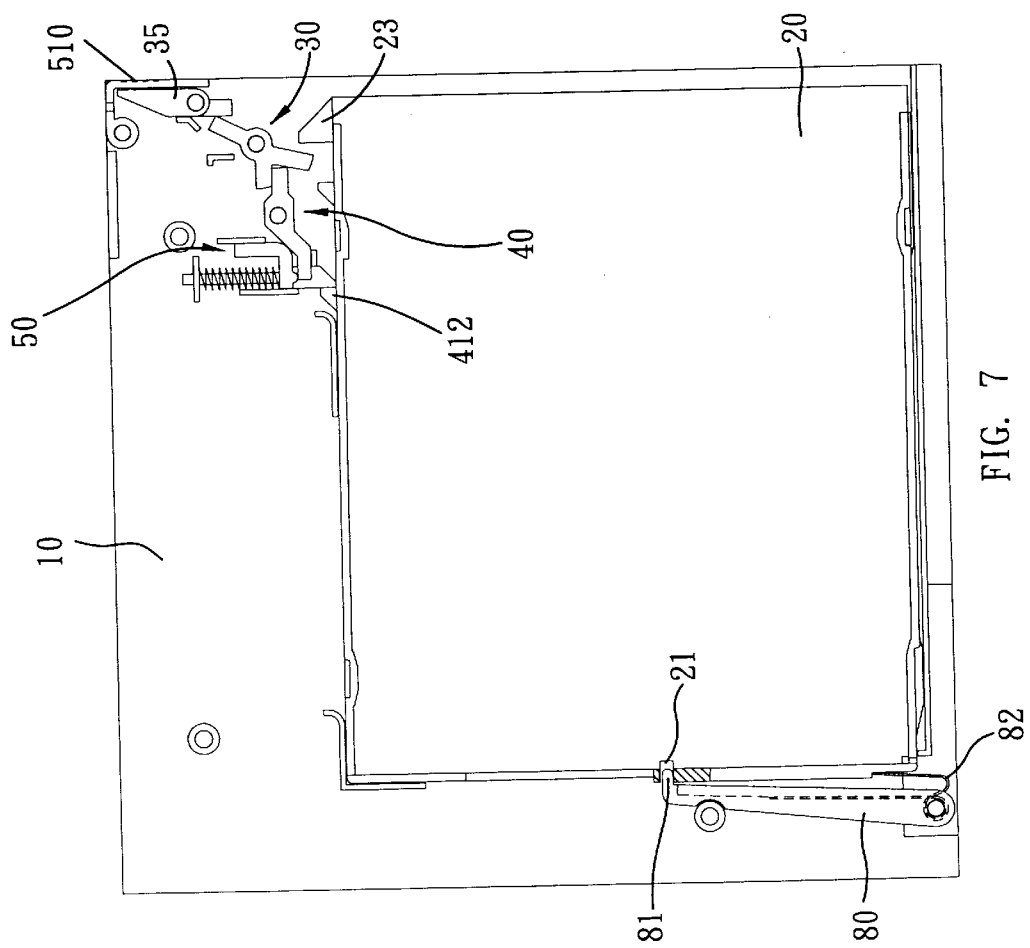
FIG. 7 is a schematic diagram of the third embodiment according to the present invention.

Please refer to FIG. 7, which is a schematic diagram of the third embodiment according to the present invention. The third embodiment differs from the above two embodiments in that the lever 35 is covered inside the module by a cover 510. Accordingly, if a user wants to eject the module of computer, he needs to open the cover 510 before he operates the lever 35.

Figure 8:
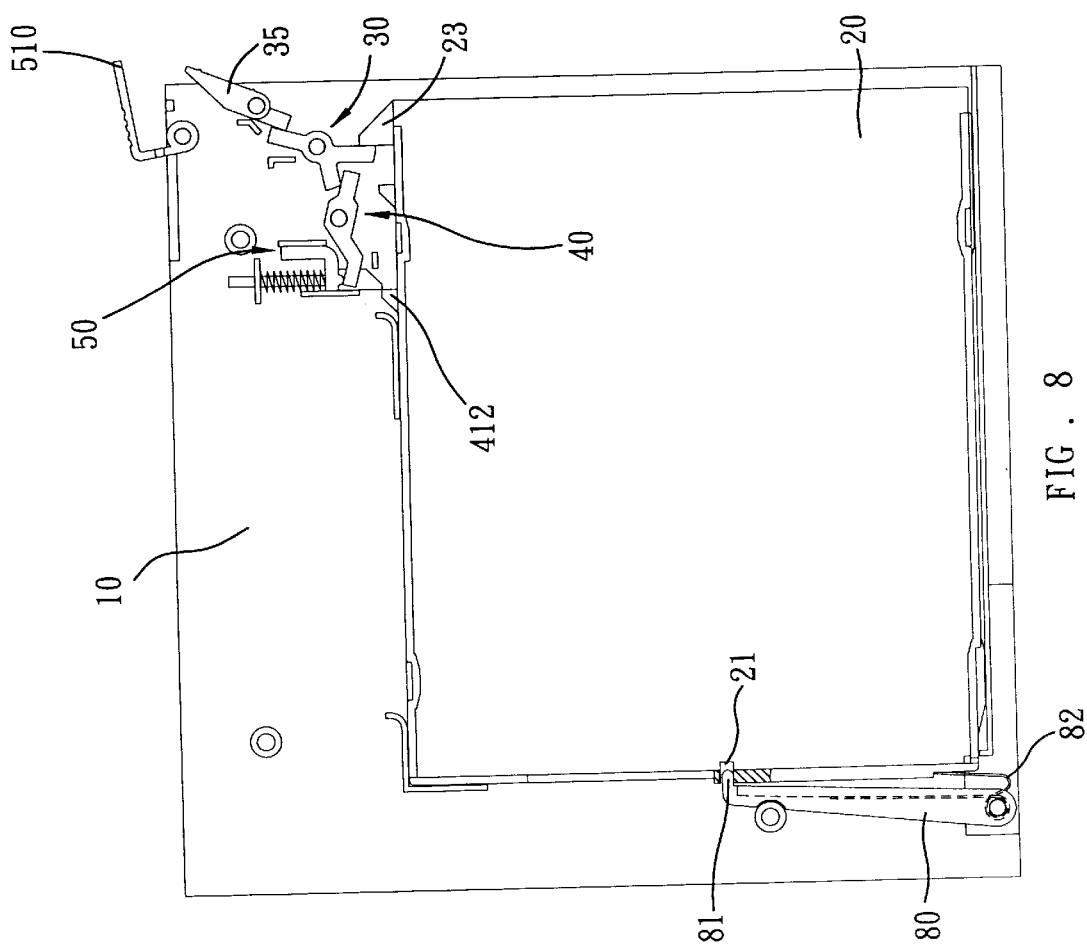
FIG. 8 shows the first status of the third embodiment according to the present invention.
Figure 9:
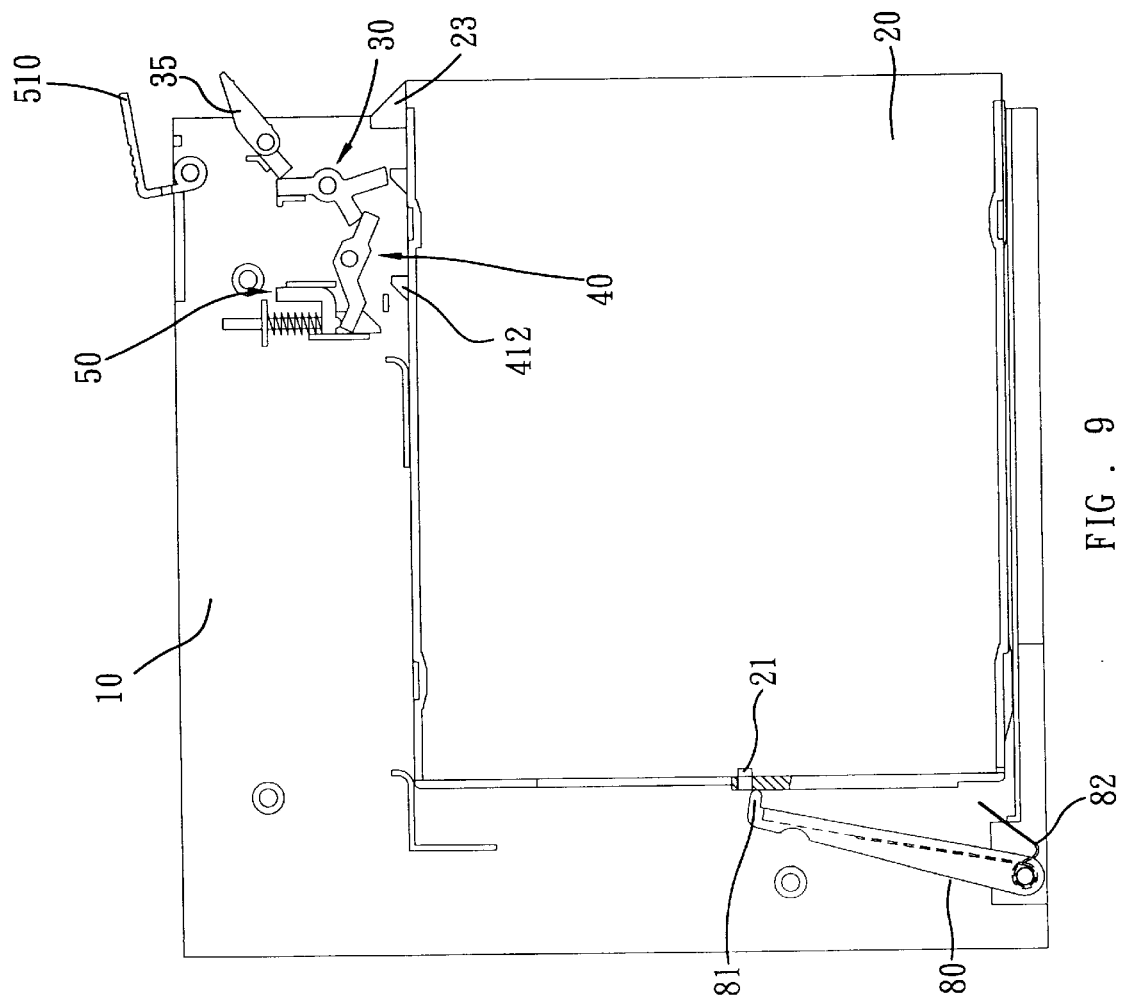
FIG. 9 shows the second status of the third embodiment according to the present invention.

The transmission statuses of the third embodiment are shown in FIG. 8 and FIG. 9. As shown in FIG. 8, after the user opens the cover 510, he is allowed to operate the lever 35. Moreover, the operating direction of the lever 35 is different from the ones of the above two embodiments. The lever 35 acts on the first lever arm 30 so that the first lever arm 30 will rotate, and the second lever arm 40 will rotate accordingly. Then the second lever arm 40 acts on the fastening bolt 50 to move for releasing the fastened status between the fastening bolt 50 and a fastening block 412; at the same time, the first lever arm 30 pushes the projecting tooth 23 to cause the tray 20 to move outwardly; however, at this moment, the projecting portion 81 of the pushing arm 80 still fastens the sunken slot 21 of the tray 20 so that the tray 20 can not be ejected by the spring sheet 82 and the pushing arm 80. As shown in FIG. 9, after the lever 35 progresses further to a larger angle, the first lever arm 30 keeps on pushing the projecting tooth 23 until the projecting portion 81 escapes from the sunken slot 21. After the projecting portion 81 escapes from the sunken slot 21, the pushing arm 80 will employ the spring force of the spring sheet 82 to eject the tray 20 so as to accomplish the ejection motion of the module of computer.

In contrast to the prior art, these three embodiments described above provide users to choose and install the required module in a notebook computer according to their needs. In addition, without the necessary of reversing the computer, the user can easily mount and dismount the module on the computer. Moreover, for mounting the module of computer, the user only need to push the tray toward the base plate, then the module can be fixed on the computer.

The module of computer mentioned above may be a floppy disk drive, a CD-ROM drive, a CD-R CD-R/W drive, a DVD drive, an MO disk drive, a battery module, etc.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A module carrier of computer installed on a base plate for automatically ejecting a module of a computer of notebook type comprising:
    a tray for carrying the module of computer;
    a transmission apparatus for releasing the fastened status of the tray comprising:
        a lever for starting the module carrier of computer to perform the ejection motion of the module of computer;
        a first lever arm for providing the transmission action and one end of the first lever arm joining the lever;
        a second lever arm for providing the transmission action and one end of the second lever arm joining the first lever arm;
        a fastening bolt for fastening the tray and joining the second lever arm;
        a pushing arm for pushing and ejecting the tray; and
        a spring sheet attached to the pushing arm for providing the needed spring force for ejecting the tray,
    wherein after a user operates the lever, the lever acts on the first lever arm so that the first lever arm will rotate, the second lever arm will rotate accordingly, the second lever arm acts on the fastening bolt to move for releasing the fastened status of the tray, and then the spring sheet provides a spring force to the pushing arm enabling the pushing arm to push and eject the tray.

2. The module carrier of computer as claimed in claim 1, wherein the pushing arm comprises a projecting portion at one end.

3. The module carrier of computer as claimed in claim 2, wherein the tray comprises a sunken slot for adapting the projecting portion of the pushing arm.

4. The module carrier of computer as claimed in claim 1, wherein the tray further comprises a fastening slot for the fastening bolt to fasten the tray.

5. The module carrier of computer as claimed in claim 1, wherein the tray further comprises a projecting tooth to be pushed by the first lever arm causing the tray to move outwardly.

6. The module carrier of computer as claimed in claim 1, wherein the module of computer can be the module of a floppy disk drive, a CD-ROM drive, a CD-R CD-R/W drive, a DVD drive, an MO disk drive, or a battery.

7. A module carrier of computer installed on a base plate for automatically ejecting a module of a computer of notebook type comprising:

a tray for carrying the module of computer;

a transmission apparatus for releasing the fastened status of the tray comprising:

a lever for starting the module carrier of computer to perform the ejection motion of the module of computer;

a lever arm for providing the transmission action and one end of the lever arm joining the lever;

a fastening bolt for fastening the tray and joining the lever arm;

a pushing arm for pushing and ejecting the tray; and a spring sheet attached to the pushing arm for providing the needed spring force for ejecting the tray, wherein after a user operates the lever, the lever acts on the lever arm and the lever arm will rotate, the fastening bolt will move for releasing the fastened status of the tray, and then the spring sheet provides a spring force to the pushing arm enabling the pushing arm to push and eject the tray.

8. The module carrier of computer as claimed in claim 7, wherein the pushing arm comprises a projecting portion at one end.

9. The module carrier of computer as claimed in claim 8, wherein the tray comprises a sunken slot for adapting the projecting portion of the pushing arm.

10. The module carrier of computer as claimed in claim 7, wherein the tray further comprises a fastening slot for the fastening bolt to fasten the tray.

11. The module carrier of computer as claimed in claim 7, wherein the tray further comprises a projecting tooth to be pushed by the first lever causing the tray to move outwardly.

12. The module carrier of computer as claimed in claim 7, wherein the module of computer may be the module of a floppy disk drive, a CD-ROM drive, a CD-R CD-R/W drive, a DVD drive, an MO disk drive, or a battery.

13. A module carrier of computer installed on a base plate for automatically ejecting a module of a computer of notebook type comprising:

a tray for carrying the module of computer;

a transmission apparatus for releasing the fastened status of the tray comprising:

a lever for starting the module carrier of computer to perform the ejection motion of the module of computer;

a first lever arm for providing the transmission action and one end of the first lever arm joining the lever;

a second lever arm for providing the transmission action and one end of the second lever arm joining the first lever arm;

a fastening bolt for fastening the tray and joining the second lever arm;

a cover for covering the first lever arm;

a pushing arm for pushing and ejecting the tray; and a spring sheet attached to the pushing arm for providing the needed spring force for ejecting the tray, wherein after a user opens the cover and operates the lever, the lever acts on the first lever arm so that the first lever arm will rotate, the second lever arm will rotate accordingly, the second lever arm acts on the fastening bolt to move for releasing the fastened status of the tray, and then the spring sheet provides a spring force to the pushing arm enabling the pushing arm to push and eject the tray.

14. The module carrier of computer as claimed in claim 13, wherein the pushing arm comprises a projecting portion at one end.

15. The module carrier of computer as claimed in claim 14, wherein the tray comprises a sunken slot for adapting the projecting portion of the pushing arm.

16. The module carrier of computer as claimed in claim 13, wherein the tray further comprises a fastening slot for the fastening bolt to fasten the tray.

17. The module carrier of computer as claimed in claim 13, wherein the tray further comprises a projecting tooth to be pushed by the first lever arm causing the tray to move outwardly.

18. The module carrier of computer as claimed in claim 13, wherein the module of computer may be the module of a floppy disk drive, a CD-ROM drive, a CD-R CD-R/W drive, a DVD drive, an MO disk drive, or a battery.

* * * * *